United States Patent [19]
Schmidt

[11] 3,881,096
[45] Apr. 29, 1975

[54] APPARATUS FOR DETERMINING POSITION LOCATION BASED ON RANGE DIFFERENCES

[75] Inventor: Ralph O. Schmidt, Santa Ana, Calif.

[73] Assignee: Interstate Electronics Corporation, Anaheim, Calif.

[22] Filed: Sept. 19, 1973

[21] Appl. No.: 398,599

Related U.S. Application Data

[63] Continuation of Ser. No. 197,361, Nov. 10, 1971, abandoned.

[52] U.S. Cl. ..... 235/150.27; 235/150.271; 343/103; 343/112 C
[51] Int. Cl. ......................... G06g 7/78; G06g 15/50
[58] Field of Search .......... 343/103, 15, 6.5, 112 R, 343/112 C, 112 TC; 235/150.2, 150.27, 150.271, 150.272

[56] References Cited
UNITED STATES PATENTS

| | | | |
|---|---|---|---|
| 3,002,691 | 10/1961 | Newell et al. | 343/112 C |
| 3,020,545 | 2/1962 | Losher | 343/112 R |
| 3,659,085 | 4/1972 | Potter et al. | 235/150.2 |
| 3,665,464 | 5/1972 | Meilander | 343/112 TC |
| 3,706,096 | 12/1972 | Hammach | 343/15 |
| 3,755,817 | 8/1973 | Wipff et al. | 235/150.2 |

FOREIGN PATENTS OR APPLICATIONS

| | | | |
|---|---|---|---|
| 1,240,146 | 5/1967 | Germany | 340/24 |
| 1,214,754 | 4/1966 | Germany | 340/24 |
| 1,448,730 | 7/1969 | Germany | 235/150.27 |

*Primary Examiner*—Felix D. Gruber
*Attorney, Agent, or Firm*—Knobbe, Martens, Olson, Hubbard & Bear

[57] ABSTRACT

Computing apparatus employing a range difference location-method wherein the reference stations are combined in fundamental triads to generate a straight line of position on which the location lies; the line of position being the axis of a general conic; each of the reference stations of the triad lying on the general conic; and the location being at a focus of said general conic.

4 Claims, 11 Drawing Figures

APPARATUS FOR DETERMINING POSITION LOCATION BASED ON RANGE DIFFERENCES

BACKGROUND OF THE INVENTION

This invention relates to the field of range difference location and, more specifically, to the utilization of a geometry for range difference location which allows a straight line of position (LOP).

Range difference location has become a common navigational tool which is used, for example, in Loran, Decca, Omega, etc. These systems typically utilize transmitters operating in pairs at selected permanent sites. Signals are commonly transmitted from a transmitter pair and are received at the craft at different times, these times being dependent upon the distance of the craft from each of the transmitters. A measurement is made of the difference in the time of arrival ($\Delta$TOA) of the transmitted signals for the determination of the differential difference between the craft and each of the two transmitters. Since the speed of transmission, as well as the position of each of the transmitters, is known, the $\Delta$TOA may be used to compute the differential distance between the craft and the two transmitters. All locations which will produce a particular $\Delta$TOA in response to signals from a given station pair lie along a hyperbolic line. This hyperbola must include the craft position. Special charts and tables are supplied for use with station pairs and graphically superimpose the hyperbolic LOP on a chart which often includes the transmitter locations. Signals from two or more station pairs are needed to fix the position of the craft through the intersection of at least two such hyperbolic LOP's. Although analytic approaches have been proposed, graphical techniques are almost universally used for position location using such hyperbolic intersection, since the analytic solutions are sufficiently unwieldy to make practical use of them cumbersome. On the other hand, the attractiveness of position location through the measurement of the $\Delta$TOA of radio signals is attested to by the construction of Loran and Decca facilities whose practical utilization is limited by the inconvenience of the required graphical solution of position location.

SUMMARY OF THE INVENTION

The present invention provides an analytical solution to range difference location by altering the fundamental hypothesis on which hyperbolic range difference location is based. As stated earlier, this axiom is: a pair of known stations are the foci of a hyperbola, and the difference in range to these stations provides a hyperbolic LOP. The axiom which has been developed in the present invention is: the three known stations lie on a general conic; the differences in range to three known stations provides a straight LOP which is the axis of the general conic; and a focus of the general conic is the location in question.

Whereas hyperbolic range difference location placed the stations at the foci of a hyperbola and the location somewhere on the hyperbola, the present solution places the known stations on the general conic and the location in question on one of the foci of the conic. Since the foci must exist on the conic axis, the conic axis provides a straight LOP.

In the preferred embodiments which are described, the mathematics of solution are presented both for a region which is assumed flat, that is, a Euclidean solution, and for a region which covers a large part of the earth's surface. In each instance, the solution is exact and non-iterative. These solutions, in the preferred embodiments, are either hard wired or programmed on a general purpose computer. In the general purpose computer embodiment, an input program changes the computer configuration to solve the mathematics of solution. In both the hardware and software embodiments, inputs which include the measured $\Delta$TOA of signals from three stations and data representing the known position of each of the stations are used. With a knowledge of the algorithm presented herein, along with the application of this algorithm to the solution of the location problem as discussed herein, and using the specific embodiments disclosed, a great variety of general purpose computers can be properly programmed by those skilled in the art to solve the location problem. In addition, using this knowledge those skilled in the art will recognize the possibility of building a variety of special purpose hard-wired equipment for the solution of this specific problem.

The preferred embodiment is described in reference to the attached drawings, in which.

DETAILED DESCRIPTION OF THE PREFERRED EMBODIMENT

Initially, a comparison of the axiom which underlies prior art hyperbolic range difference location systems and the axiom which underlies the present invention is helpful to a thorough understanding of the present invention.

Figure 1:
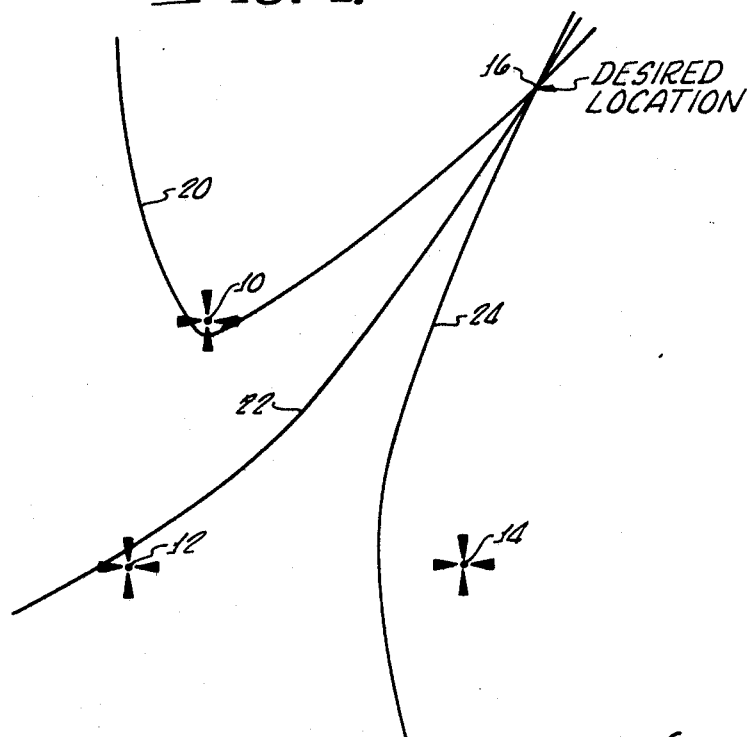
FIG. 1 is a diagram of the essential features and operation of the prior art range difference navigation algorithm.

Referring to FIG. 1, an array of three stations 10, 12 and 14 is shown. The position of each of these stations 10, 12 and 14 is known and is available to the operator, generally in the form of fixed positions on a chart or map. A signal is simultaneously transmitted from stations 10 and 12, which signals are received at the craft 16 at different times, due to the different range to the stations 10 and 12. This difference in time may be converted to distance through a knowledge of the rate of transmission. All the locations in the plane of the stations 10, 12 and 14 which will produce the measured $\Delta TOA$ lie along the hyperbolic LOP 20. The craft 16 must, therefore, lie somewhere along this LOP 20. It should be noted at this point that the direction of transmission may be reversed. That is, the craft at position 16 may transmit a signal which is received by each of the stations 10 and 12. The $\Delta TOA$ of these signals may then be measured at the stations 10 and 12, resulting in the same $\Delta TOA$ as was previously discussed.

In a similar manner, measurement in the $\Delta TOA$ of signals from stations 10 and 14 yields a hyperbolic LOP 22 and the measurement of the $\Delta TOA$ of signals from stations 12 and 14 yields a hyperbolic LOP 24. Since the craft must be at a position 16 which lies on each of the hyperbolic LOP's 20, 22 and 24, these lines must intersect at the point 16. Therefore, by taking any two pairs of stations, the operator may construct the hyperbolic LOP for each pair and, using the hyperbolic charts provided for the particular stations in question, graphically solve for the intersection of the hyperbolae and for the location of point 16. This solution, as discussed previously, does not lend itself to analytical solutions which are not cumbersome.

Figure 2:
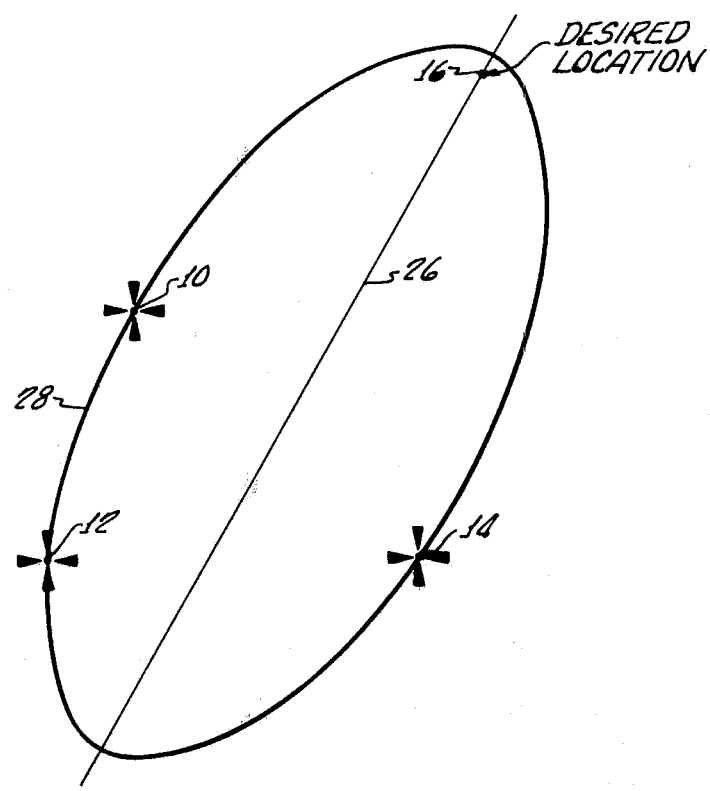
FIG. 2 is a diagram of the essential features and operation of the range difference navigation algorithm of the present invention.

Referring now to FIG. 2, the fundamental axiom of the present location system will be explained. FIG. 2 shows the same three stations 10, 12 and 14, the positions of which are known. Likewise, the craft, the location of which is to be determined, is at a point 16, which is identical to the point 16 in FIG. 1. In the present invention, however, the stations 10, 12 and 14 are considered as a fundamental triad, rather than being considered in pairs. This fundamental triad yields a straight LOP 26 which is the axis of a conic, which in this case is an ellipse 28. The point 16 lies on the conic axis 26 and each of the stations 10, 12 and 14 lie on the conic 28. The derivation of the straight LOP 26 lends itself to a concise, exact and non iterative solution of the location of point 16. This may be accomplished through the intersection of two such straight LOP's 26. To generate this intersection, a new fundamental triad is used. This new triad may include two stations of the initial triad, but must introduce at least one new station to the computation. Thus, a fourth station may be combined with any two of the stations 10, 12 and 14 to produce a second straight LOP which would intersect the LOP 26 at the point 16. If only three known stations are available, the location of point 16 may be determined through an analytical solution of the location of the focus of the conic 28, since, as will be shown subsequently, the point 16 must lie on one focus of the conic 28.

TWO DIMENSIONAL EUCLIDEAN ALGORITHM

Figure 3:
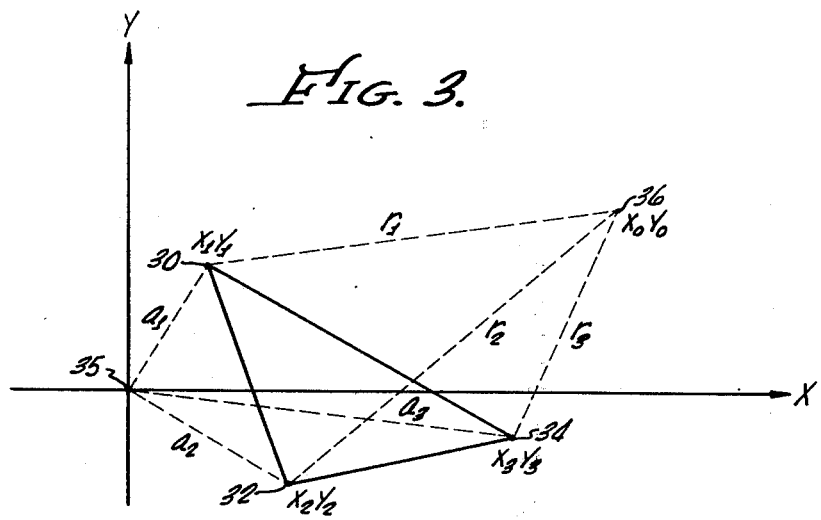
FIG. 3 is a chart of station locations and the desired location in an arbitrary two dimensional Euclidean coordinate system.

The solution of the location problem based on the axiom that the fundamental triad lie on a conic whose axis includes the desired location is derived in two dimensional Euclidean space as follows. Referring to FIG. 3, the position of three stations, 30, 32 and 34 are in the plane of a two dimensional coordinate system, the origin 35 and orientation of which are arbitrarily determined so that the positions of each of the stations 30, 32 and 34 may be defined in terms of X and Y distances from the origin 35. This origin 35, for example, could be one end of a runway and the X axis of the arbitrary coordinate system could be selected to be collinear with the axis of the runway, so that the position of an aircraft in relation to the runway could be determined. In this example, then, the position of each of the stations 30, 32 and 34 is known in terms of the coordinate system to be used, so that, for example, $(X_1, Y_1)$ are the coordinates of the station 30, $(X_2, Y_2)$ are the coordinates of the station 32 and $(X_3, Y_3)$ are the coordinates of the station 34.

If it is now assumed that the position to be located, as for example the position of an aircraft, is at the point 36, having unknown coordinates $(X_o, Y_o)$ in this same coordinate system, the solution is as follows:

Equipment, such as that which is commonly used in the present hyperbolic LOP navigation systems, is used to determine the $\Delta TOA$ of signals simultaneously transmitted from each of the stations 30, 32 and 34. These difference measurements can be readily transformed to the difference in range from the position 36 to the positions 30, 32 and 34, respectively, through a multiplication of the $\Delta TOA$'s by the rate of propagation of the transmitted signals. If the range between the position 36 and the stations 30, 32 and 34 are designated $r_1$, $r_2$ and $r_3$, respectively, then the difference in ranges between the various stations may be defined as follows:

$$\Delta_{12} = r_2 - r_1, \Delta_{23} = r_3 - r_2, \Delta_{31} = r_1 - r_3$$

In addition, the distance from the origin 36 to each of the stations 30, 32 and 34 may be defined as $a_1$, $a_2$ and $a_3$, respectively, which distances may be found as follows:

$$a_1^2 = X_1^2 + Y_1^2, a_2^2 = X_2^2 + Y_2^2, a_3^2 = X_3^2 + Y_3^2$$

Using these definitions, $$r_1^2 = (X_o - X_1)^2 + (Y_o - Y_1)^2 = X_o^2 + Y_o^2 - 2X_oX_1 - 2Y_oY_1 + X_1^2 + Y_1^2$$

$$= X_o^2 + Y_o^2 - 2X_oX_1 - 2Y_oY_1 + a_1^2$$

(1)

$$r_2^2 = (X_o - X_2)^2 + (Y_o - Y_2)^2 = X_o^2 + Y_o^2 - 2X_oX_2 - 2Y_oY_2 + X_2^2 + Y_2^2$$

$$= X_o^2 + Y_o^2 - 2X_oX_2 - 2Y_oY_2 + a_2^2$$

(2)

$$r_3^2 = (X_o - X_3)^2 + (Y_o - Y_3)^2 = X_o^2 + Y_o^2 - 2X_oX_3 - 2Y_oY_3 + X_3^2 + Y_3^2$$

$$= X_o^2 + Y_o^2 - 2X_oX_3 - 2Y_oY_3 + a_3^2$$

(3)

If equation 1 is subtracted from equation 2:

$$r_2^2 - r_1^2 = (r_2 - r_1)(r_1 + r_2) = \Delta_{12}(r_1 + r_2) = -2X_o(X_1 - X_2) + 2Y_o(Y_1 - Y_2) + (a_2^2 - a_1^2)$$

(4)

Which may be rewritten as follows:

$$r_1+r_2=2X_o(X_1-X_2)/\Delta_{12} + 2Y_o(Y_1-Y_2)/\Delta_{12} + (a_2^2-a_1^2)/\Delta_{12}$$

(5)

Similarly, if equation 2 is subtracted from equation 3:

$$r_3^2-r_2^2=(r_3-r_2)(r_2+r_3)=\Delta_{23}(r_2+r_3)=$$
$$2X_o(X_2-X_3)+2Y_o(Y_2-Y_3)+(a_3^2-a_2^2)$$

(6)

Which may be rewritten as follows:

$$r_2+r_3=2X_o(X_2-X_3)/\Delta_{23} + 2Y_o(Y_2-Y_3)/\Delta_{23} + (a_3^2-a_2^2)/\Delta_{23}$$

(7)

Likewise, if equation 3 is subtracted from equation 1:

$$r_1^2-r_3^2=(r_1-r_3)(r_3+r_1)=\Delta_{31}(r_3+r_1)=$$
$$2X_o(X_3-X_1)+2Y_o(Y_3-Y_1)+(a_1^2-a_3^2)$$

(8)

Which may be rewritten as follows:

$$r_3+r_1=2X_o(X_3-X_1)/\Delta_{31} + 2Y_o(Y_3-Y_1)/\Delta_{31}+ (a_1^2-a_3^2)/\Delta_{31}$$

(9)

Subtracting equation 9 from equation 7 yields the following:

$$(r_2+r_3)-(r_3+r_1)=r_2-r_1=\Delta_{12}=$$
$$2X_o[(X_2-X_3)/\Delta_{23}-(X_3-X_1)/\Delta_{31}] +$$
$$2Y_o[(Y_2-Y_3)/\Delta_{23}-(Y_3-Y_1)/\Delta_{31}] +$$
$$(a_3^2-a_2^2)/\Delta\Delta_{23}-(a_1^2-a_3^2)/\Delta_{31}$$

(10)

Which, after clearing the denominators and rearranging, yields:

$$\Delta_{12}=2X_o[\Delta_{31}(X_2-X_3)-\Delta_{23}(X_3-X_1)] +$$
$$2Y_o[\Delta_{31}(Y_2-Y_3)-\Delta_{23}(Y_3-Y_1)] +$$
$$\Delta_{31}(a_3^2-a_2^2)-\Delta_{23}(a_1^2-a_3^2)$$

(11)

Equation 11 may be rewritten in the following form:

$$½(\Delta_{31}\Delta_{23}\Delta_{12}) = X_o[X_1\Delta_{22}+ X_2\Delta_{31} + X_3(\Delta_{12}-\Delta_{12}-\Delta_{31}-\Delta_{23})] +$$
$$Y_o[V_1\Delta_{23}+Y_2\Delta_{31}+Y_3(\Delta_{12}-\Delta_{12}-\Delta_{31}-\Delta_{23})]+$$
$$½ [-a_1^2\Delta_{23}-a_2^2\Delta_{31}+ a_3^2(\Delta_{12}-\Delta_{12}+\Delta_{31}+\Delta_{23})]$$

(12)

Since, $$\Delta_{12}+\Delta_{23}+\Delta_{31}=$$
$$r_2-r_1+r_3-r_2+r_1-r_3=0$$

(13)

then, $$X_o[X_1\Delta_{23}+X_2\Delta_{31}+X_3\Delta_{12}] + Y_o[Y_1\Delta_{23}+Y_2\Delta_{31}+Y_3\Delta_{12}]=$$
$$½ [\Delta_{12}\Delta_{23}\Delta_{31}+a_1^2\Delta_{23}+a_2^2\Delta_{31}+a_3^2\Delta_{12}]$$

(14)

This equation is in the form of AX+BY=C and is therefore the equation of a straight line. This equation defines the axis of the conic on which the stations 30, 32 and 34 lie; and A, B and C in this equation are constants which are calculated from the known positions of the stations 30, 32 and 34 in the selected coordinate system and from the three ΔTOA's.

Having determined the equation for the conic axis, two alternative approaches are available for the solution of the location of the position 36 of FIG. 3. The first of the solutions is accomplished through the selection of a second triad of stations, two of which might be identical with two of the original triad of stations, in order to locate the axis of a second conic on which axis the position 36 of FIG. 3 must also lie. If the equation 14 is stated in terms of $AX_0+BY_0=C$, the equation for the axis of the second conic may similarly be expressed in terms $DX_0+EY_0=F$. A solution of these equations simultaneously therefore yields:

$$X_o=(CE-FB)/(AE-BD)$$

(15)

$$Y_o=(AF-DC)/(AE-BD)$$

(16)

If, on the other hand, only three stations, such as the stations 30, 32 and 34, are available, a computation of the location 36 is still possible. The conic 28 of FIG. 2 can take two alternative forms, which forms depend upon the position of the three stations and the ΔTOA's which have been measured. In one instance, the conic is an ellipse and the location to be determined is one focus of the ellipse. The other focus is a point which, had the desired position solution existed there, would produce the negative of each of the measured ΔTOA's. In the other alternative, the conic is a hyperbola, in which case placing the desired location at either focus would result in the same set of ΔTOA's. It is only in the instance where the conic is a hyperbola that an ambiguity arises and a non-analytical decision must be made as to the correct focus. This decision cannot be made mathematically, since the received ΔTOA's could have arisen from either focus location. A limiting case occurs where one focus of the two conic foci has moved off to infinity, in which case the conic is a parabola. In this instance, the desired location is at that focus which has a determinable value.

In order to solve the three station case for the position to be determined, it is first necessary to define the conic on which the stations lie. Five coefficients are needed to completely specify a general conic. In the present instance, the axis and three points on the conic are known. In order to simplify this analysis, the known conic axis can be made coincident to the X axis through a translation and rotation of the conic. After this alignment, the equation for the general conic is as follows:

$$(X-X_c)^2/u^2 + Y^2/w^2 = 1$$

(17)

Where $X_c$ is the distance along the X axis to the center of the conic.

Equation 17 can be rewritten as follows:

$$(X^2 - 2XX_c + X_c^2)/u^2 + Y^2/w^2 = 1 \tag{18}$$

Which may be rearranged in the following form:

$$X^2(w^2/u^2) + X(-2X_c w^2/u^2) + w^2/u^2 \, (X_c^2 - u^2) = -Y^2 \tag{19}$$

Equation 19 may be expressed as:

$$MX^2 + NX + P = -Y^2 \tag{20}$$

Where, $$M = w^2/u^2 \tag{21}$$

$$N = -(2w^2 X_c)/u^2 \tag{22}$$

$$P = w^2(X_c^2 - u^2)/u^2 \tag{23}$$

It is now possible to write three equations in three unknowns by inserting the known locations of the stations 30, 32 and 34. However, since we have assumed, for simplification of this analysis, that the conic axis has been made coincident with the X axis, it is first necessary to rotate and translate the coordinate system in which the locations are defined. Referring to equation 14, which is the equation for the conic axis in the form of $AX + BY = C$, it will be noted that this line crosses the X axis at a value of $X = C/A$. Therefore, by redefining $X_t = X - (C/A)$, the conic axis passes through the origin of the redefined coordinate system. The station locations may now be rotated about the origin of this redefined coordinate system. The angle through which this rotation must take place is equal to, $$\theta = \text{Tan}^{-1} A/B \tag{24}$$

so that the rotated coordinates of the station locations may now be defined as follows:

$$X_r = X_t \cos\theta + Y_t \sin\theta \tag{25}$$

$$Y_r = -X_t \sin\theta + Y_t \cos\theta \tag{26}$$

$X_r$ and $Y_r$ may therefore be defined in terms of the original X and Y locations as follows:

$$X_r = (X - C/A)\cos\theta + Y\sin\theta \tag{27}$$

$$Y_r = -(X - C/A)\sin\theta + Y\cos\theta \tag{28}$$

Since each of the rotated and translated station locations must satisfy the equation 20, we may now construct three equations in three unknowns based on the location of each of the stations and equation 20 as follows:

$$X_{r1}^2 M + X_{r1} N + P = -Y_{r1}^2 \tag{29}$$

$$X_{r2}^2 M + X_{r2} N + P = -Y_{r2}^2 \tag{30}$$

$$X_{r3}^2 M + X_{r3} N + P = -Y_{r3}^2 \tag{31}$$

The simultaneous solution of equations 29, 30 and 31 yields the following values of M, N and P.

$$M = \frac{-Y_{r1}^2 X_{r2} + Y_{r3}^2 X_{r2} - X_{r1} Y_{r3}^2 + X_{r3} Y_{r1}^2 - Y_{r2}^2 X_{r3} + Y_{r2}^2 X_{r1}}{X_{r1}^2 X_{r2} - X_{r3}^2 X_{r2} + X_{r1} X_{r3}^2 - X_{r3} X_{r1}^2 + X_{r2}^2 X_{r3} - X_{r2}^2 X_{r1}} \tag{32}$$

$$N = \frac{-X_{r1}^2 Y_{r2}^2 + X_{r3}^2 Y_{r2}^2 - Y_{r1}^2 X_{r3}^2 + Y_{r3}^2 X_{r1}^2 - X_{r2}^2 Y_{r3}^2 + X_{r2}^2 Y_{r1}^2}{X_{r1}^2 X_{r2} - X_{r3}^2 X_{r2} + X_{r1} X_{r3}^2 - X_{r3} X_{r1}^2 + X_{r2}^2 X_{r3} - X_{r2}^2 X_{r1}} \tag{33}$$

$$P = \frac{-X_{r1}^2 X_{r2} Y_{r3}^2 + X_{r3}^2 X_{r2} Y_{r1}^2 - X_{r1} Y_{r2}^2 X_{r3}^2 + X_{r3} Y_{r2}^2 X_{r1}^2 - Y_{r1}^2 X_{r2}^2 X_{r3} + Y_{r3}^2 X_{r2}^2 X_{r1}}{X_{r1}^2 X_{r2} - X_{r3}^2 X_{r2} + X_{r1} X_{r3}^2 - X_{r3} X_{r1}^2 + X_{r2}^2 X_{r3} - X_{r2}^2 X_{r1}} \tag{34}$$

It is now possible to use the values of M, N and P, as defined in equations 21, 22 and 23 to determine the value of $X_c$, $u^2$ and $w^2$ as follows:

$$X_c = -\tfrac{1}{2}(N/M) \tag{35}$$

$$u^2 = X_c^2 - P/M \tag{36}$$

$$w^2 = Mu^2 \tag{37}$$

Since $X_c$ provides the center of the conic, and since the distance to either focus from the center of the conic is, $$(u^2 + w^2)^{1/2} \tag{38}$$

the foci are therefore defined in the rotated and translated coordinate system as follows:

$$X_r(F_1) = X_c + (u^2 - w^2)^{1/2} \qquad (39)$$

$$Y_r(F_1) = 0 \qquad (40)$$

$$X_r(F_2) = X_c - (u^2 - w^2)^{1/2} \qquad (41)$$

$$Y_r(F_2) = 0 \qquad (42)$$

These locations, which are solutions to the location problem, may be redefined in terms of the original coordinate system by again rotating the coordinate system by the angle Theta and translating along the X axis by a distance of C/A. The problem solutions are therefore as follows:

$$X(F_1) = [X_c + |u^2 - w^2|^{1/2}] \cos\theta + C/A \qquad (43)$$

$$Y(F_1) = [X_c + |u^2 - w^2|^{1/2}] \sin\theta \qquad (44)$$

$$X(F_2) = cX_c - |u^2 - w^2|^{1/2}] \cos\theta + C/A \qquad (45)$$

$$Y(F_2) = [X_c - |u^2 - w^2|^{1/2}] \sin\theta \qquad (46)$$

It may now be determined whether the conic along which each of the stations exists is a hyperbola in which each of the foci is a legitimate solution to the problem or an ellipse in which only one focus is a legitimate solution. The values of $X(F_1)$ and $Y(F_1)$ may be substituted for $X_o$ and $Y_o$ in equations 1 and 2 to determine the values of $r_1^2$ and $r_2^2$. By taking the square root of these values and substracting $r_1$ from $r_2$, the value of $\Delta_{12}$ may be found. If the sign of this calculated $\Delta_{12}$ is different from the sign of the measured $\Delta_{12}$, the conic is an ellipse and the values $X(F_2)$ and $Y(F_2)$ are the solution to the location problem. If the calulated $\Delta_{12}$ has the same sign as the measured $\Delta_{12}$ the same procedure may be followed to determine the sign of the calculated $\Delta_{12}$ when $X(F_2)$ and $Y(F_2)$ are substituted in equations 1 and 2. If the $\Delta_{12}$ calculated for $F_2$ has a different sign than the measured $\Delta_{12}$, the focus at $X(F_1)$ and $Y(F_1)$ is the solution to the location problem. If however, the $\Delta_{12}$ for both points $F_1$ and $F_2$ have the same sign as the measured $\Delta_{12}$, both of these points are legitimate solutions to the problem and an analytical explanation of the correct location is impossible. It is often possible, however, for the operator of equipment utilizing this location technique to readily determine which focus properly defines the desired location, since one of the foci will be located at a position which is a highly improbable solution to the location problem.

As stated in equation 13, the present analysis has assumed that the sum of $\Delta_{12}$, $\Delta_{23}$ and $\Delta_{31} = 0$. When measurements of these parameters are made in a physical environment, it is quite likely that the sum of these range differences will not actually equal 0. It has been statistically determined that the errors in the location solution can be minimized by averaging the total error in these range difference measurements. In order to accomplish this, the measured $\Delta_{12}$, $\Delta_{23}$ and $\Delta_{31}$ are added, and the sum of these quantities is divided by three. The resulting ⅓ of the measurement error is then subtracted from each of the quantities $\Delta_{12}$, $\Delta_{23}$ and $\Delta_{31}$ to force the sum of these quantities to be 0. The error is thus spread among the $\Delta$TOA's through this averaging technique, producing a statistically more accurate computation based on the adjusted $\Delta$TOA's.

Figure 4:
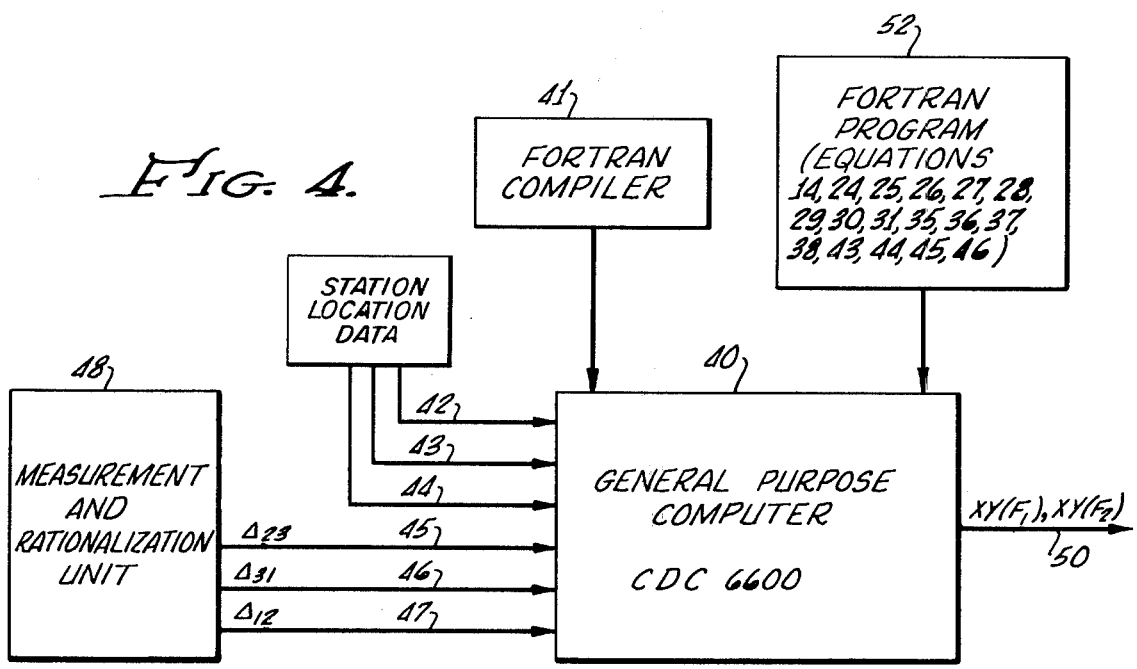
FIG. 4 is a schematic block diagram of a general purpose computer circuit for practicing the two dimensional Euclidean location solution according to the present invention.

The procedure outlined above for the location of the foci of the conic utilizing only three stations may be conducted through a properly programmed general purpose computer. In a particular embodiment, this has been accomplished as shown in FIG. 4 using a CDC 6600 computer 40 including a fortran program language compiler 41. Input data is applied to this computer 40 as shown by the arrows 42 through 47. This input data comprises the station locations as defined in the selected coordinate system and the range difference measurements. These range difference measurements supplied to the computer 40 in the present embodiment must be in terms of distance within the selected coordinate system. It is therefore necessary to include a measurement and rationalization unit 48 which measures the time of arrival of the signals from each of the station locations, computes the time differences between these times of arrival and multiplies these time differences by the rate of propagation of the transmission medium to produce the required $\Delta$'s for the inputs 45-47. The unit 48 includes a measurement unit for measuring the time of arrival of the signals and for computing and outputting the time differences between the times of arrival, which measurement unit may be, for example, a LORAN navigational set manufactured under military designation number AN/PSN-1 by Electronic Concepts, Inc., a division of ATO, Inc. In addition, the unit 48 includes a rationalization unit which is a multiplier which multiplies these time differences by the propagation rate to produce the required $\Delta$'s. Such multipliers are likewise well known in the computer art. The unit 48 therefore measures the $\Delta$TOA's and converts them to range differences through multiplication by the propagation rate in a well known manner.

The computer 40 produces as an output, as shown by the arrow 50, the X and Y locations of the foci in the selected coordinate system. To this system, and particularly to the computer 40, must be added a fortran language program 52 which will change the physical characteristics of the computer 40 so that the computer 40 may handle the mathematical algorithm explained above to generate the desired locations. In the embodiment shown in FIG. 4 this program 52 may be as follows. It will be noted that the actual statement language has been interspersed with comments in order to facilitate understanding of the program in terms of the equations which have been presented above. The statements themselves are the required programming input to the computer 40 and appear at the left margin. The comments relating to these statements have been indented in order to clearly distinguish them from the actual programming language. The parameters used in this program are as follows:

| | |
|---|---|
| X, Y | -The X,Y coordinates of the 3 stations |
| D | -The 3 measured range differences, (R3–R2), (R1–R3), (R2–R1) |
| FX,FY | -X,Y coordinates of the two conic foci solution locations |

FORTRAN PROGRAM (1) Dimension X(3),Y(3),D(3),FX(2),FY(2),AA(9),BB(3),XX(3),YY(3),XP(3)
   This statement reserves storage registers for the listed variables and parameters so that the computer is forewarned of the number of storage register locations required for each.

(2) AVG=(D(1)+D(2)+D(3))/3.
(3) D(1)=D(1)–AVG
(4) D(2)=D(2)–AVG
(5) D(3)=D(3)–AVG
   These statements average the measurement error of the ΔTOA's as described above by adding the Δ's and dividing by 3 and subsequently subtracting ⅓ of the sum from each of the Δ's. Having accomplished this, the sum of the Δ's, that is, of D(1), D(2) and D(3), must be 0.

(6) A=X(1)*D(1)+X(2)*D(2)+X(3)*D(3)
(7) B=Y(1)*D(1)+Y(2)*D(2)+Y(3)*D(3)
(8) C=.5*(D(1)*D(2)*D(3)+D(1)*(X(1)2+Y(1)2)+D(2)*(X(2)2+Y(2)2)+D(3)*(X(3)2+Y(3)2))
   These statements evaluate the parameters of $X_0$, $Y_0$ and the constant in equation 14 when that equation is stated in terms of $AX_0+BY_0=C$. It will be noted that, for purposes of this program, D1 is the difference between $r_3$ and $r_2$, D2 is the difference between $r_1$ and $r_3$, and D3 is the difference between $r_2$ and $r_1$.

(9) XXX=C/A
   This statement determines the translational offset required by equations 27 and 28 to force the conic axis to cross the X axis of the selected coordinate system at the origin.

(10) TH=ATAN(–A/B)
   This is a determination of the angle between the X axis and the conic axis as defined in equation 24.

(11) DO 1 I=1,3
(12) XP(I)=X(I)–XXX
(13) XX(I)=XP(I)*COS(TH)+Y(I)*SIN(TH)
(14) YY(I)=–XP(I)*SIN(TH)+Y(I)*COS(TH)
(15) AA(I)=XX(I)**2
(16) AA(I+3)=XX(I)
(17) AA(I+6)=1.
(18) 1 BB(I)=–YY(I)**2
   These statements comprise a DO LOOP initiated by statement 11 which requires that the variable I be incremented for each pass through the statements 12 through 18, so that, for example, in statement 12 the X coordinate of each of the three stations will be used in turn for the computation of XP(I). Statement 12 offsets the X coordinate by the factor calculated in statement 9. Statements 13 and 14 are comparable to equations 25 and 26 and serve to rotate the coordinate system so that the conic axis is coincident with the X axis of the rotated coordinate system. Statements 15, 16 and 17 create an array for a subroutine which will simultaneously solve equations 29, 30 and 31. In order to accomplish this simultaneous solution, the coefficients must be placed in the proper matrix order so that, as stated in statement 15, the first three values of AA are equal to the rotated and translated X coefficient of the three station locations squared. As can be seen in equations 29, 30 and 31, these are the coefficients of M. Similarly the 4th, 5th and 16 as the coefficients of N in equations 29, 30 and 31, and the 7th, 8th and 9th values of AA are defined in statement 17 to be equal to 1 as is required for the coefficient of P in equations 29, 30 and 31. In a similar fashion, statement 18 sets a variable BB equal to values of $-YY^2$, that is, equal to the $-Y^2$ values in equations 29, 30 and 31. These preliminary definitions are required for the succeeding step.

(19) CALL SIMQ(AA,BB,3,KS)
   Statement 19 calls a subroutine which is entitled SIMQ and is a standard fortran subroutine supplied by the computer manufacturer. This subroutine will simultaneously solve the equations 29, 30 and 31 once the proper variables, that is, AA and BB, have been defined. The numeral 3 in statement 19 indicates that 3 simultaneous equations are to be solved. The notation KS indicates that a normal solution to the equations is possible, that is, that the determinant is not 0. This subroutine will produce as an output the values of M, N and P in equations 29, 30 and 31 and will place these values respective in BB(1), BB(2), and BB(3).

(20) XC=–.5*BB(2)/BB(1)
   Statement 20 defines $X_c$ in a manner equivalent to equation 35.

(21) ASQ=XC**2–BB(3)/BB(1)
   Statement 21 defines ASQ in the same manner as $u^2$ is defined in equation 36.

(22) (BSQ=BB(1)*ASQ
   Statement 22 defines BSQ in the same manner as $w^2$ is defined in equation 37.

(23) F=SQRT(ABS(ASQ–BSQ))
   Statement 23 defines F as a value calculated in equation 38.

(24) FX(1)=(SC+F)*COS(TH)+XXX
(25) FX(2)=(SC–F)*COS(TH)+XXX
(26) FY(1)=(XC+F)*SIN(TH)
(27) FY(2)=(XC–F)*SIN(TH)
   These statements 24 through 27 define the X and Y locations of the two foci of the conic in the origin coordinate system in accordance with equations 43, 45 and 46.

(28) END
   This statement ends the program with the focal locations stored in the FX and FY registers. If it desired to output these focal values it is necessary prior to this END statement to introduce an output statement such as a WRITE statement.

As can be seen, the fortran statement presented and described previously will solve the range difference location geometry to locate the foci and will average any error in the sum of the inputted ΔTOA's.

As an alternative, the desired location may be found through the use of a special purpose hard-wired apparatus which will be explained in reference to FIGS. 5 through 7. This apparatus first calculates the equation for the conic axis using a fundamental triad of stations and then, by using another station triad to generate a second conic axis equation, the apparatus solves for the coordinates of the intersection of the two conic axes.

Figure 5:
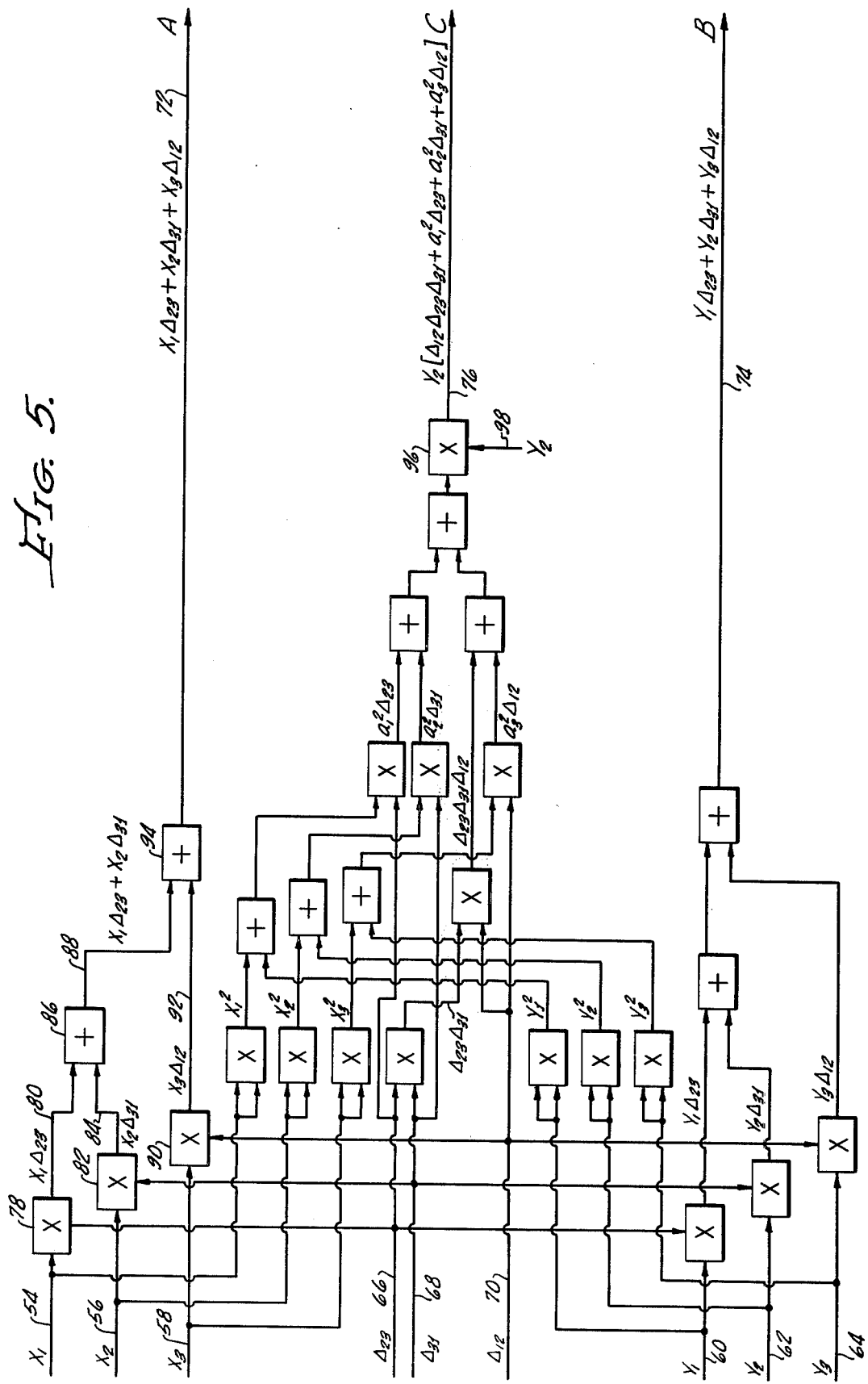
FIG. 5 is a schematic diagram of a hard wired circuit for practicing the two dimensional Euclidean LOP solution according to the present invention.

Referring first to FIG. 5, this schematic diagram shows apparatus for calculating the parameters of the equation for the conic axis in response to a fundamental triad of stations. That is, the coordinates of $X_0$ and $Y_0$, as well as the constant, in equation 14 are calculated by the apparatus of FIG. 5.

The X and Y coordinates of each of the three stations in the fundamental triad are inputted to the system on lines 54, 56, 58, 60, 62 and 64. Likewise, the range differences between the desired location and each pair of the fundamental triad of stations are inputted on the lines 66, 68 and 70. In a typical system, each of the input lines, 54 through 70 carries digital data, typically binary coded, which data may be, for example, equivalent to a distance in feet on each of the lines 54, 56, 58, 60, 62 and 64 and to a range difference, also in feet, on lines 66, 68 and 70. This data, as was explained earlier, may be produced by well known prior art units, such as the measurement and rationalization unit 48 shown in FIG. 4.

The circuit of FIG. 5 has three output lines 72, 74 and 76 on which the circuit generates signals, typically in binary form, which are equivalent to the coefficients of $X_0$, $Y_0$ and the constant, respectively, of equation 14. As an example of the operation of the circuit shown in FIG. 5, the production of data on one output line 72 will be described in detail. The coefficient $X_1$ on line 54 is multiplied by the coefficient $\Delta_{23}$ on line 66 in a multiplier 78. This multiplier 78, and each of the multipliers designated by a multiplication sign in FIG. 5, is a typical digital multiplying circuit for use with binary data. Such multiplication units are well known in the digital computer art and produce as output data, as on line 80, a binary signal equivalent to the product of the two input binary numbers. The line 80 is therefore shown as conducting a binary signal equivalent to the product $X_1\Delta_{23}$. In a similar manner, the coefficient $X_2$ on line 56 and the coefficient $\Delta_{31}$ on line 68 are combined in a multiplier 82 to produce, on an output line 84, a signal equivalent to the product $X_2\Delta_{31}$.

The lines 80 and 84 are connected to the input of an adder 86. This adder 86, and each of the adders in the circuit of FIG. 5 which are designated with a + sign, is also well known in the digital computer art and produces on an output line 88 a binary digital signal which is equivalent to the sum of the signals on lines 80 and 84. The signal on line 88 is therefore shown to be equivalent to the sum of $X_1\Delta_{23}+X_2\Delta_{31}$.

A multiplier 90 generates the product of the coefficient $X_3$ on line 58 and the coefficient $\Delta_{12}$ on line 70 on a line 92 which is shown as conducting a signal equivalent to $X_3\Delta_{12}$. The signals on lines 88 and 92 are combined in an adder 94 to generate on the output line 72 a signal which is equivalent to the sum of $X_1\Delta_{23}+X_2\Delta_{31}+X_3\Delta_{12}$. As will be noted, this is the coefficient of $X_0$ in equation 14.

In an equivalent manner the remainder of the elements in the circuit shown in FIG. 5 combine, through multiplication and addition, the input coefficients to generate, on lines 74 and 76, the coefficient of $Y_0$ and the constant in equation 14, respectively. It should be noted that the multiplier 96 has, as one of its inputs, a line 98 which is designed to input a binary signal equivalent to the value ½ each time a multiplication is conducted by the multiplier 96. The signal on line 98 may be produced, for example, by a register which stores the value ½ and which is read at the initiation of each multiplication by the multiplier 96.

As was suggested in the explanation of equation 14, the equation is in the form $AX+BY=C$. Line 72 conducts the value of A, line 74 conducts the value of B, and line 76 conducts the value of C. Those familiar with the digital circuit art will readily recognize that each of the multipliers and each of the adders in the circuit shown in FIG. 5 may be replaced by a single multiplier and a single adder, along with a series of storage registers, so that the input data may be circulated through the multiplier and adder, with the products and sums stored in storage registers until they are required for combination with another product or sum in the adder or multiplier, at which time the storage registers may be used to supply the data for this next computational step. Although computation in this form produces a substantial saving in hardware, the time required for the calculation of the coefficients A, B and C will be extended.

Figure 6:
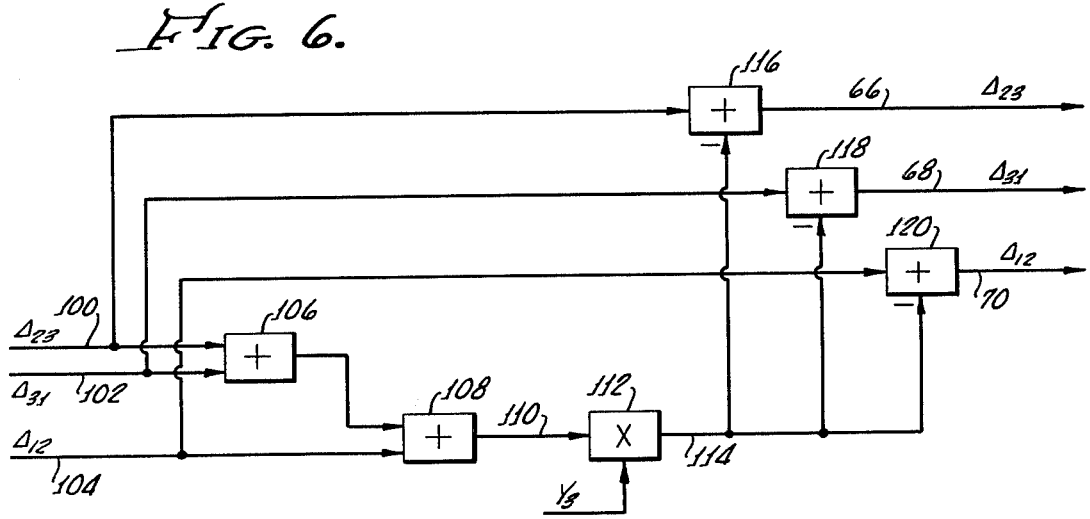
FIG. 6 is a schematic diagram of a hard wired $\Delta$TOA averaging circuit which may be used in conjunction with the circuit of FIG. 5.

The circuit of FIG. 6 may be used, in addition to the circuit of FIG. 5, if it is desired to average the error in the measured $\Delta TOA$'s. This circuit is connected to three input lines 100, 102 and 104 which conduct the binary values of the coefficients $\Delta_{23}$, $\Delta_{31}$ and $\Delta_{12}$, respectively. These coefficients, as described above, may be generated by the measurement and rationalization unit 48 shown in FIG. 4. The coefficients on each of the lines 100, 102 and 104 are added in adders 106 and 108 to produce on an output line 110 of the adder 108 the sum of the three coefficients. This sum on line 110 is multiplied by a value equivalent to ⅓ in a multiplier 112. The value equivalent to ⅓ is generated in a manner similar to the generation of the value equivalent to ½ on the line 98 in FIG. 5. The product produced by the multiplier 112 on a line 114 is subtracted from each of the signals on lines 100, 102 and 104 in adders 116, 118 and 120. These adders 116, 118 and 120 may be made to function as subtracters by automatically changing the sign of the input coefficient on line 114, so that a new set of coefficients is produced on lines 66, 68 and 70 which are equivalent to the values $\Delta_{23}$, $\Delta_{31}$, and $\Delta_{12}$ after the error has been distributed among these coefficients. These lines 66, 68 and 70 may then be connected to the inputs of the equivalent number shown in FIG. 5.

Figure 7:
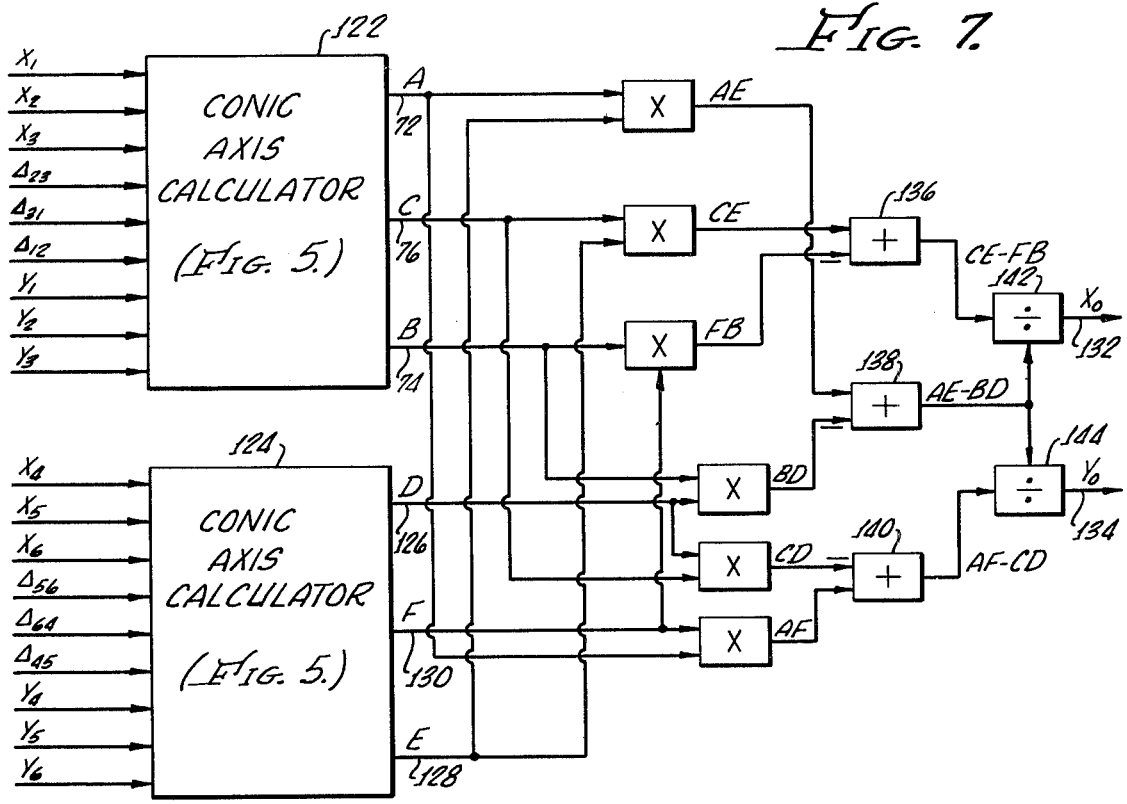
FIG. 7 is a schematic diagram of a hard wired circuit which may be used to combine LOP's generated by the circuit of FIG. 5 to generate the desired location solution.

Two conic axis calculators, such as that shown in FIG. 5, may be combined, as shown in FIG. 7, to calculate the desired location. It will be understood that a conic axis calculator 122 is responsive to a fundamental triad of stations and a conic axis calculator 124 is responsive to a second fundamental triad of stations. This second fundamental triad must include at least one station which is not included in the fundamental triad which produces the inputs to the conic axis calculator 122. The output lines 72, 74 and 76 of the conic axis calculator 122 have been designated A, B and C, in accordance with the designations of the output lines in FIG. 5. However, for ease of explanation, the output lines 126, 128 and 130 of the conic axis calculator 124 have been designated D, E and F, the line 126 conducting a signal from the second fundamental triad which is equivalent to the signal on line 72 and likewise, lines 128 and 130 conducting signals which are equivalent to the signals on lines 74 and 76, but for the second fundamental triad.

It will be noted that, in this explanation, the conic axis calculator 124 is shown as responsive to the X, Y and $\Delta$ values of three additional stations, that is, stations 4, 5 and 6. The circuit of FIG. 7 conducts the subtractions and divisions required in equations 15 and 16 to produce on a pair of output lines 132 and 134 binary numbers equivalent to the values $X_0$ and $Y_0$, which are the X and Y coordinates of the desired location. The multipliers in this circuit, again designated by a multiplication sign, are equivalent to the multipliers in FIG. 5. The adders, again designated by an addition sign, are likewise equivalent to those shown in FIG. 5. Each of the adders 136, 138 and 140, however, is designed to change the sign of one of its inputs so that it functions as a subtracter.

The output signals on lines 132 and 134 are produced by a pair of dividers 142 and 144, each of which may be any of a variety of circuits which are well known in the digital computer art. The divider 142 functions to divide the output of the adder 136 by the output of the adder 138. Similarly, the divider 144 divides the output of the adder 140 by the output of the adder 138. The output lines 132 and 134 may be outputted to a display which shows the X and Y coordinates of the desired location. Such displays are well known in the digital computer art.

As was the case in FIG. 5, the multiplications, additions and divisions in FIGS. 6 and 7 may all be accomplished in one multiplier, one adder and one divider by using the proper storage registers and through a proper circulation of the data. It will therefore be understood that the conic axis calculator 122 and the conic axis calculator 124 may, in fact, comprise only one such conic axis calculator, which is first used to compute the conic axis coefficients for a first fundamental triad, which coefficients are stored in a storage register. The same conic axis calculator may then be used to compute the coefficients for a second fundamental triad. These coefficients may then be combined, as shown in the circuit of FIG. 7.

It may also be noted that, if more than four stations are used for the determination of the desired location, a conic axis may be calculated for each triad within the series of stations, so that the intersection of each pair of axes may be calculated, as with a circuit such as that shown in FIG. 7. Due to measurement errors, the output coordinates produced on lines 132 and 134 for each pair of coordinate axes may differ so that it may be necessary, in order to achieve the utmost accuracy, to average (as by least mean square calculations) the output coordinates thereby taking advantage of all of the input data available.

Figure 8:
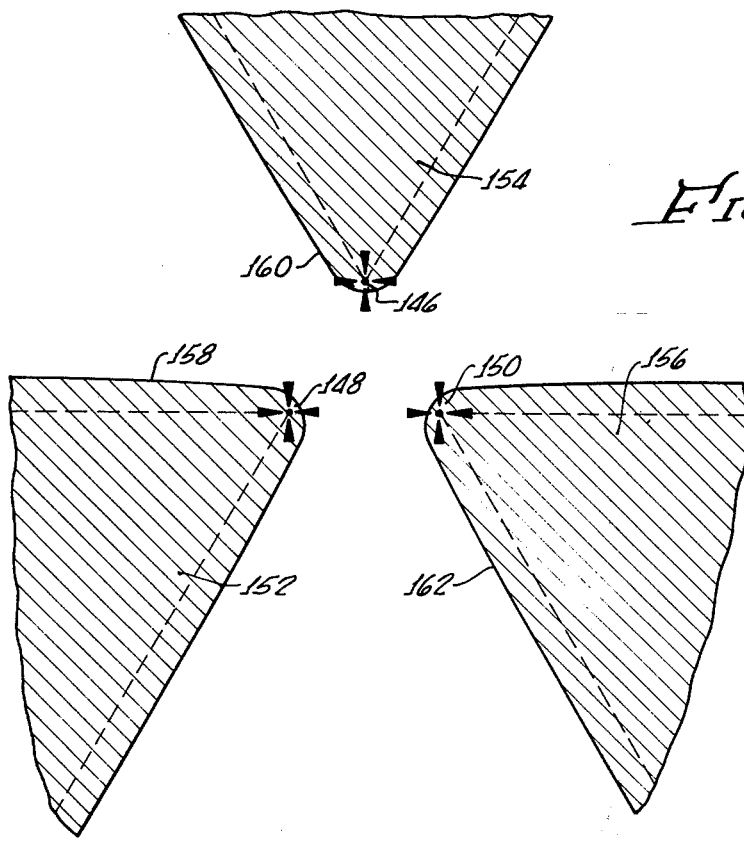
FIG. 8 is a chart of typical station locations showing the position in which the general conic is a hyperbola and an ellipse.

Referring to FIG. 8, it can be seen that for any given station array, that is, for any given fundamental triad, predeterminable areas exist in which the conic on which the stations lie is a hyperbola or an ellipse. Thus, for the stations 146, 148 and 150 of FIG. 8, areas 152, 154 and 156 may be plotted, these areas 152, 154 and 156 defining those regions in which the measured $\Delta TOA$'s will produce hyperbolic conics. In all other regions, the conic is an ellipse, except those at transition lines 158, 160 and 162, where the conic is a parabola.

THREE DIMENSIONAL EUCLIDEAN ALGORITHM

In the three dimension Euclidean case, where it is not assumed that each of the stations and the desired location lie on a plane, at least four stations are needed to provide the equation of the conic axis. The analysis for determining the equation of the conic axis in response to the measured $\Delta TOA$'s and known station locations for three stations is equivalent to the analysis in equations 1 through 14 above, but with the parameters for the third dimension added to the various equations. Such an analysis yields a plane rather than a line, that is, the equation is similar to equation 14, but for the three dimensional case is as follows:

$$[X_1\Delta_{23} + X_2\Delta_{31} + X_3\Delta_{12}]X$$
$$+[Y_1\Delta_{23} + Y_2\Delta_{31} + Y_3\Delta_{12}]Y$$
$$+[z_1\Delta_{23} + z_2\Delta_{31} + z_3\Delta_{12}]z$$
$$= \frac{1}{2}[\Delta_{12}\Delta_{23}\Delta_{31} + a_1^2\Delta_{23} + a_2^2\Delta_{31} + a_3^2\Delta_{12}] \quad (47)$$

or $AX+BY+CZ=D$. A second fundamental triad may then be used to generate a second plane. The intersection of these two planes is a line which is the axis of the three dimensional conics which are obtained by revolving two dimensional conics about their axes. In this case, the three dimensional conic is an ellipse of revolution or a circular hyperboloid of two sheets.

In this manner, pairs of fundamental quads can be used to produce the intersection of straight line conic axes, or the foci can be computed for a single quad just as in the two dimensional case.

It is therefore within the capability of those skilled in the art to utilize equation 47, along with the application of the two dimensional algorithm to the solution of the location problem as discussed above, and along with the disclosed two dimensional embodiments as guides, as the basis for a program for a general purpose computer, or as the basis for designing a hardware system such as that shown in FIGS. 5 through 7, to compute the coordinates of the desired location in a three dimensional Euclidean coordinate system.

NON-EUCLIDEAN ALGORITHM

The fundamental axiom of the present invention is also applicable to two dimensional spaces having constant curvature, such as the surface of a sphere, which is the earth's approximate shape. For example, if it is desired to locate the position of a ship at sea and if it is known that the radio transmission from the fixed stations follows the earth's curvature, so that the lines of radio transmission are great circles on the surface of the earth, the mathematic solution must conform to the spherical surface such that all straight lines take the form of great circles on the sphere. In such a corrdinate system the coordinates themselves offer the only obstacle to simplicity, since latitude and longitude, as commonly used to define locations on the earth's surface, do not form a homogenous coordinate system. However, latitude and longitude are easily converted into the homogeneous coordinate system known as direction cosines where the mathematical location solution is extremely compact.

Figure 9:
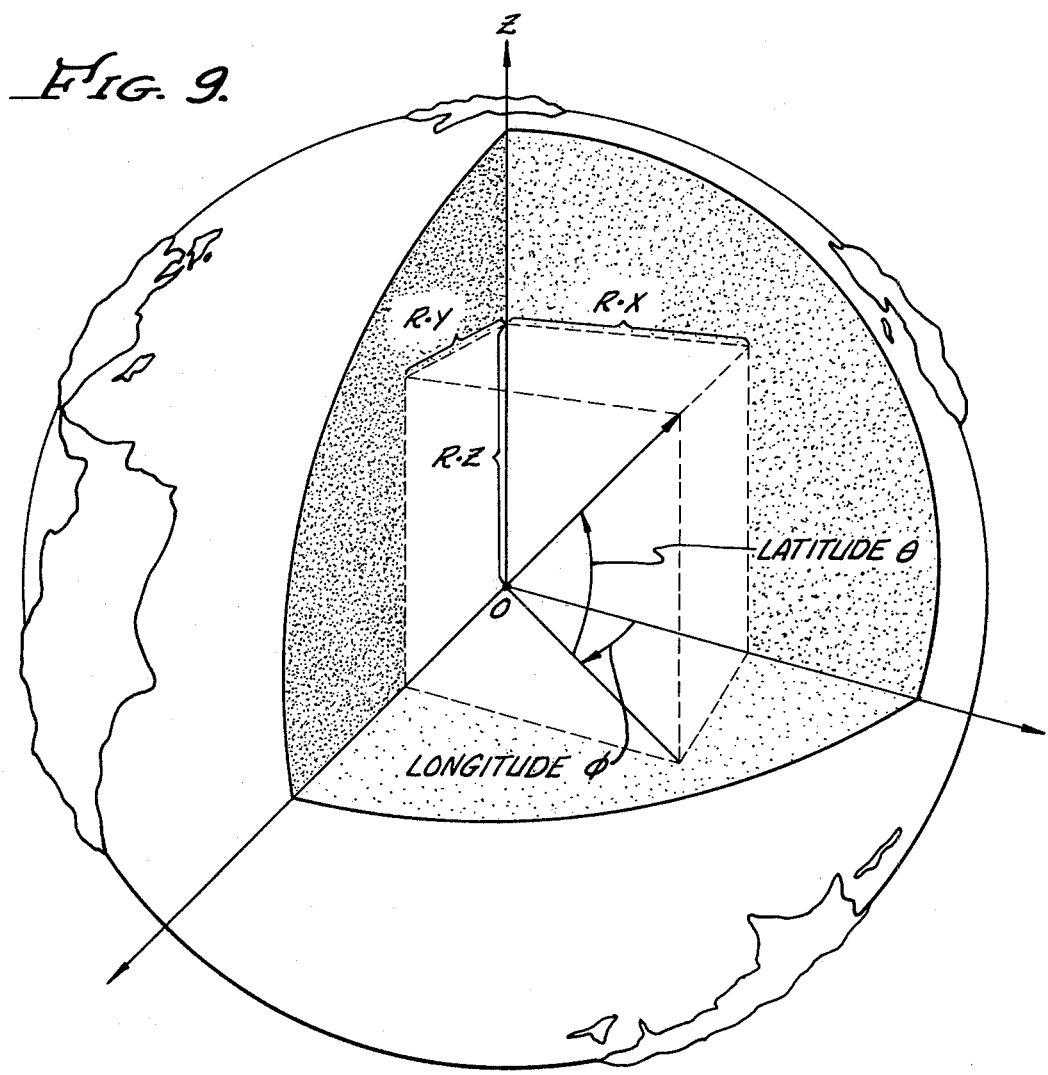
FIG. 9 is a diagram of a coordinate system which may be used for non-Euclidean solution of the range difference location problem.

Referring to FIG. 9, the coordinate system is defined in terms of X, Y and Z variables which define the location of a point on the surface of the sphere. The distance R is therefore the radius of the sphere and the X, Y and Z coordinates may be defined in terms of the latitude $\theta$ and longitude $\phi$ as follows:

$$X = \cos\theta \cos\phi \quad (48)$$

$$Y = \cos\theta \sin\phi \quad (49)$$

$$Z = \sin\theta \quad (50)$$

where, $$X^2+Y^2+Z^2 = 1 \quad (51)$$

It may now be seen that, in order to algebraically express a straight line, that is, a great circle, the polar of the line may be used, where the polar is a point which is a quadrant away from all of the points of the great circle. There are thus two polars for each such line, either of which may be used for computation. Due to the quadrant separation, the ordinary dot product of the polar and any point on the line, where the X, Y and Z coordinates of both the polar and the point on the line are considered as vectors, must be 0, since they are 90° apart.

Thus if P is the polar vector and E is a point on a line for which P is the polar, $$P \cdot E = 0 \tag{52}$$

Thus where $AX+BY=C$ was the equation for a line in Euclidean coordinates, the equation for such a line is now, $$P_X E_X + P_Y E_Y + P_Z E_Z = 0 \tag{53}$$

which, if interpreted as, $$P_X X + P_Y Y + P_Z Z = 0 \tag{54}$$

would clearly show that it is, in form, no different from the usual notation for an equation of a straight line.

Using this coordinate system, the equations for calculating the coordinates of the point P, that is, the polar of the great circle on which the desired location must lie, are as follows, $$P_X = X_1 \sin\Delta_{23} + X_2 \sin\Delta_{31} + X_3 \sin\Delta_{12} \tag{55}$$

$$P_Y = Y_1 \sin\Delta_{23} + Y_2 \sin\Delta_{31} + Y_3 \sin\Delta_{12} \tag{56}$$

$$P_Z = Z_1 \sin\Delta_{23} + Z_2 \sin\Delta_{31} + Z_3 \sin\Delta_{12} \tag{57}$$

where X, Y, Z are expressed as direction cosines; $\Delta$'s are expressed in radians. Equations 55, 56 and 57 may be expressed as, $$P = \frac{\overset{(3\times1)}{S} \overset{(3\times3)}{\sin\Delta}}{|S \sin\Delta|} \text{ (An ordinary matrix multiply)} \tag{58}$$

where,

P is the (3 × 1) column vector $$[P_X, P_Y, P_Z]^T \tag{59}$$

$\Delta$ is the (3 × 1) column vector $$[\Delta_{23}, \Delta_{31}, \Delta_{12}]^T \tag{60}$$

S is the (3×3) matrix of station locations $$S = \begin{matrix} X_1 X_2 X_3 \\ Y_1 Y_2 Y_3 \\ [Z_1 Z_2 Z_3] \end{matrix} \tag{61}$$

That the polar P does, in fact, represent a line which includes the desired location requires that, $$P \cdot E_0 = 0 \tag{62}$$

where, $$E_0 = [X_0, Y_0, Z_0] \tag{63}$$

or, $$X_0 P_X + Y_0 P_Y + Z_0 P_Z = 0 \tag{64}$$

That this is the case may be proven through the following algebraic solution to equation 64, $$X_0(X_1 \sin\Delta_{23} + X_2 \sin\Delta_{31} + X_3 \sin\Delta_{12})$$
$$+ Y_0(Y_1 \sin\Delta_{23} + Y_2 \sin\Delta_{31} + Y_3 \sin\Delta_{12}) \tag{65}$$
$$+ Z_0(Z_1 \sin\Delta_{23} + Z_2 \sin\Delta_{31} + Z_3 \sin\Delta_{12}) = 0$$

which can be written as, $$(E_0 \cdot S1) \sin\Delta_{23} + (E_0 \cdot S2) \sin\Delta_{31}$$
$$+ (E_0 \cdot S3) \sin\Delta_{12} = 0 \tag{66}$$

then since, $$(E_0 \cdot S1) = |E_0| |S1| \cos r_1 = \cos r_1 \tag{67}$$

where, $r_1$ = the radian measured distance from the point E to the point S1, it can be written that $$\cos r_1 \sin\Delta_{23} + \cos r_2 \sin\Delta_{31}$$
$$+ \cos r_3 \sin\Delta_{12} = 0 \tag{68}$$

then since, $$\Delta_{mn} = r_n - r_m \tag{69}$$

$$\cos r_1 (\sin r_3 \cos r_2 - \cos r_3 \sin r_2)$$
$$+ \cos r_2 (\sin r_1 \cos r_3 - \cos r_1 \sin r_3)$$
$$+ \cos r_3 (\sin r_2 \cos r_1 - \cos r_2 \sin r_1) = 0 \tag{70}$$

or 0=0. This verifies that the desired location is on the great circle which is defined by the polar P.

Figure 10:
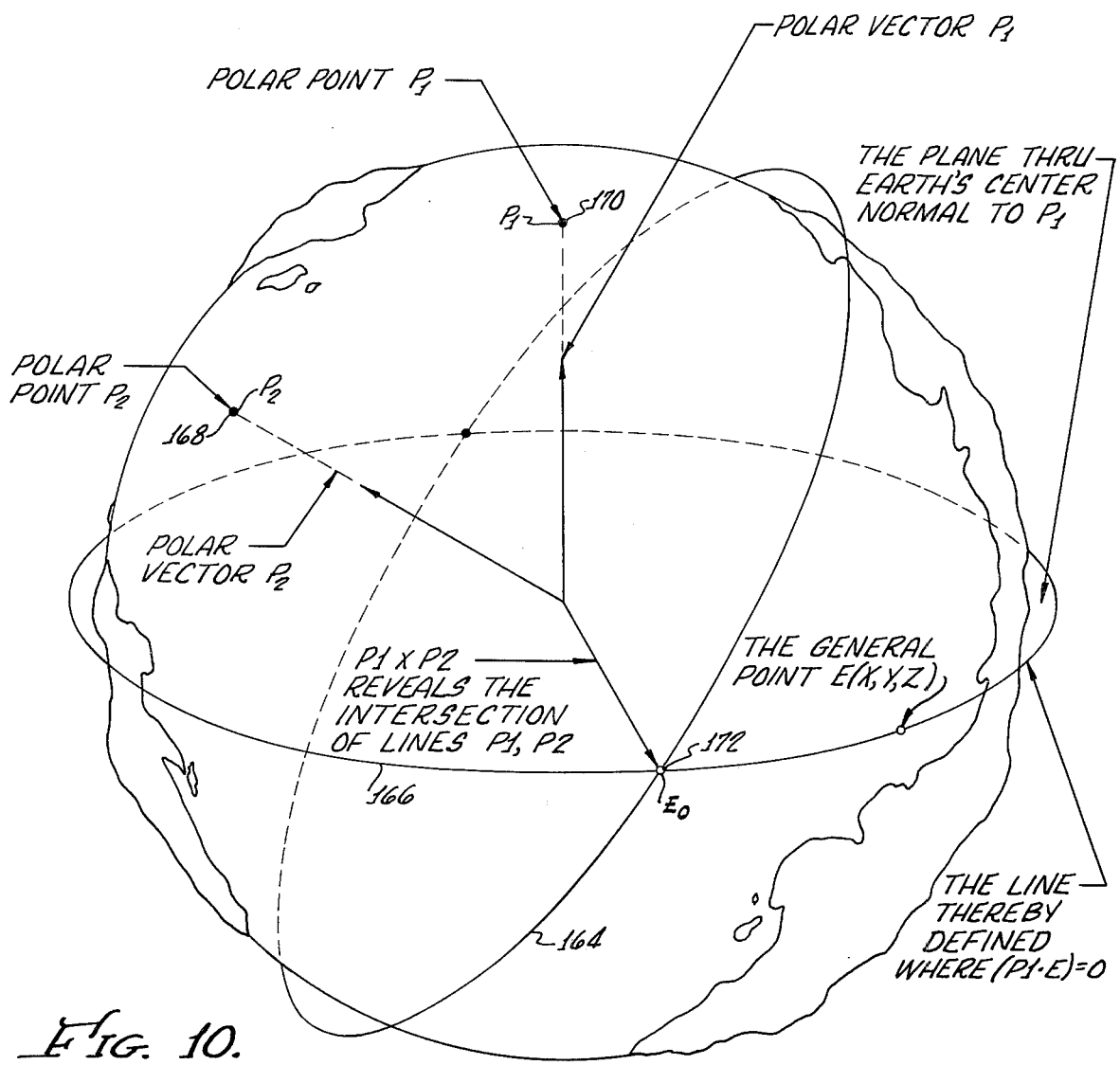
FIG. 10 is a diagram in the coordinate system of FIG. 9 showing the intersection of great circles to specify the desired location.

Referring now to FIG. 10, it can be seen that a pair of great circles 164 and 166 may be obtained from a pair of fundamental triads to generate the intersection by using the vector cross-product of the two polars 168 and 170 representing the lines, that is, the desired location is defined as follows, $$E_n = (\pm) \frac{P_1 \times P_2}{|P_1 \times P_2|} \quad (71)$$

since the point $E_0$ 172, is 90° from the plane of $P_1$, 168, and $P_2$ 170, and therefore must be on both lines.

The solution to equations 55, 56 and 57 for the generation of a great circle on which the desired location must lie, as well as the solution of equation 71 for the location of the intersection of two such great circles, may be accomplished using a special purpose hardwired computer in a manner similar to that described in reference to FIGS. 5 through 7, the algorithm described in these equations being sufficient to enable those skilled in the art to design appropriate hardware.

The solution of the non-Euclidean location problem through the intersection of great circles may likewise be accomplished through the use of a properly programmed general purpose computer. For example, in the embodiment shown in FIG. 11, and IBM 360 computer 174 is used along with an APL interpreter 176. A measurement and rationalization unit 48 comparable to that used in the system shown in FIG. 4 is used to generate the $\Delta$ values on lines 45 through 47. In this case, the rationalization unit 48 produces $\Delta$'s which are measured in radians. The X and Y coordinates are measured in direction cosines as defined by equations 48, 49 and 50. The general purpose computer 174 produces as an output on line 180 the location of the intersection of the pair of great circles 164, 166 (FIG. 10) which define the conic axis.

A program 178 must also be inputted to the general purpose computer. In this instance, an APL program is utilized which requires the use of the APL interpreter 176 with the general purpose computer 174. APL language was chosen for this embodiment due to the ease with which mathematical concepts may be manipulated thereby. It will be realized, however, that another language may be chosen for the application of this algorithm in a commercial environment. As an example, the following program may be used, where the inputted data includes the location of five stations for the production of ten great circle conic axis. The desired location is located through the intersection of pairs of the ten great circle conic axes, which intersections are solved for the best statistical intersection location through a least mean square averaging technique. This solution is outputted on line 180. The APL program for accomplishing this location solution is as follows.

Spherical N Station APL Program

```
∇ T ← S SNLOCA Δ;DEL;J;M;P;PP;Q;W;Z
[1]   Q ← 0    3    ρM ← 1 ↑ ρP ← 2 2 1
      φ( ⍳ N)°.×(3=⍳+P)/P ← (Nρ2)τ ⍳
      1+2*N ← (⁻1+J ← 0)↑ρS
[2]   → (M>1↑ρQ ← Q,[1] S[;PP] POLE DEL ← 1
      ⌽Δ[1⌽PP;⁻1⌽PP ← (0 ≠ P[J;])/P[J ← J+1;]])/2
[3]                        T ← T,[1.5]−T ← −(W-
      ,⁻1)×Z←÷(+/(1,W←−Q[;3]⊞Q[; 1 2])*2)* 0.5
∇

∇ P ← S POLE Δ
[1]  P ← S+.×1oΔ
∇
```

In addition to the method described above, wherein the point of intersection of great circles is located, it is possible to locate the foci in the non-Euclidean case in a manner similar to the foci location described in equations 15 through 46, that is, by utilizing only a single fundamental triad. The following analysis may be used to locate the foci of the conics of revolution, which foci define the possible positions of the desired location.

Whereas, in the Euclidean version, the coordinate system is rotated so as to place the known conic axis on one of the coordinate axes, so that by solving a set of three simultaneous equations the conic foci can be located (after rotating the coordinate system back, the foci along with it). In the non-Euclidean version the procedure is similar. The polar of the straight line (great circle) containing the desired location is translated to the north pole along the spherical coordinate system, putting the conic axis on the equator. The foci are then found (there are four of them in spherical geometry, since there are always two ellipses or two back to back hyperbolae depending on the point of view) and translated back for representation in the original coordinate system. There are always two focal solutions producing the measured $\Delta$TOA's, the other two focal solutions producing the negative of the measured $\Delta$TOA's.

The general equation form for the spherical conic is, $$aX^2 + bY^2 + cZ^2 = 0$$

where $$X^2 + Y^2 + Z^2 = 1$$

(72)

The equation of the same conic having an axis on the line Z=0 (i.e. on the equator) is, $$a(X \cos\theta + Y \sin\theta)^2 + b(-X \sin\theta + Y \cos\theta)^2 + Z^2 = 0$$

where $$X^2 + Y^2 + Z^2 = 1$$

(73)

and $\theta$ = the longitude of the conic center.

Equation 73 can be rewritten in the following form, $$(a \cos^2\theta + b \sin^2\theta)X^2 + (a \sin^2\theta + b \cos^2\theta)Y^2 + (a-b) XY \sin 2\theta = -Z^2$$

(74)

or $uX^2 + vY^2 + wXY = -Z^2$ for which three equations in $u$, $v$ and $w$ can be written, using the station locations $(X_1, Y_1, Z_1)$, $(X_2, Y_2, Z_2)$, and $(X_3, Y_3, Z_3)$. Thus, knowing values of $u$, $v$ and $w$ one can solve for $a$, $b$ and $\theta$ as follows, $$u = a \cos^2\theta + b \sin^2\theta$$

(75)

$$v = a \sin^2\theta + b \cos^2\theta$$

(76)

$$w = (a-b) \sin 2\theta$$

(77)

Thus, $$u-v = (a-b) \cos 2\theta \tag{78}$$

and, $$\tan 2\theta = w/(u-v) \tag{79}$$

or, $$\theta = \tfrac{1}{2} \tan^{-1} w/(u-v) \tag{80}$$

and, $$a = \tfrac{1}{2} [(u+v) + (u-v)/\cos 2\theta] \tag{81}$$

$$b = \tfrac{1}{2} [(u+v) - (u-v)/\cos 2\theta] = (u+v)-a \tag{82}$$

The focal distances, on either side of center are, $$f = \pm [(b-ab)/(b-a)]^{1/2},$$
$$\pm [(ab-a)/(b-a)]^{1/2}, 0 \tag{83}$$

Figure 11:
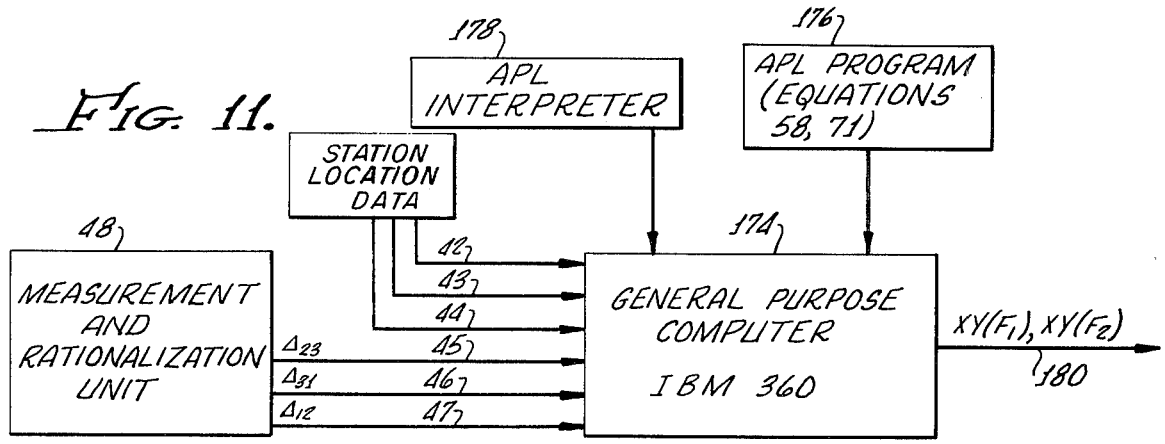
FIG. 11 is a schematic block diagram of a general purpose computer circuit for practicing the spherical location solution according to the present invention.

This procedure can be seen to be analogous to the solution for the foci in the Euclidean case. This non-Euclidean solution has been programmed in APL for use in the computer apparatus which is shown in FIG. 11. The APL program required for this solution is as follows,

```
∇ T ← S S3LOCA Δ;A;B;AB;F;SS;Q;P
[1] SS ← (A ← (P ← P÷(+/(P ← S+.×1oα)*2)*0.5)
    SPOTATE 0 0 1)+.×S
[2]   B ←    ((2   1 °-o0.5×⁻3OQ[3]÷Q[1]-
    (Q ← (−SS[3;]*2) ⊞ (φSS[1  2 ;]*2),×+SS[1 2
    ;])[2]),0) SROTATE 1 0 0
[3]                      AB ← AB,(Q[1]+Q[2-
    ])−AB ← 0.5×Q[1]+Q[2]+(Q[1]−Q[2]-
    ×4oQ[3]÷Q[1]−Q[2]
[4] T ← (φB+.×A)+.×φ((⁻1+2×φ 2 2 ⲡ0, ⲓ 3),0)×
    4                                    3
ρF ← ((F,1−F ← A-
    B[2]×(1−AB[1])÷AB[2]-AB[1])*0.5),0
∇
∇ M ← A SROTATE B;C;D
[1] M ← ((0,C,−C)[3  3  ρ 1 7 3 4 1 5 6 2
    1]×ooD)+(D× 3 3 ρ 1 0 0 0)+(1−D ← +λ
    /A×B)×C°.×C ← C÷(+/(C ← (1φA×1φB)−⁻1-
    φA×⁻1φB)* 2)*0.5
∇
```

This program produces four foci, two of which are legitimate candidates for the desired location and the other two of which produce the negatives of a measured ΔTOA's.

What is claimed is:

1. Apparatus for determining the position of an unknown location, in response to signals defining the positions of at least three known locations and signals defining the different in distance between said unknown location and pairs of said known locations, comprising:

first computer means responsive to said signals defining positions and said signals defining distance differences for producing signals mathematically defining the axis of a conic bearing a relationship to said known locations, said axis passing through said unknown location; and second computer means responsive to said signals mathematically defining the axis of a conic for producing signals specifying possible locations on said axis one of which is coincident with said unknown location.

2. Apparatus for determining the position of an unknown location as defined in claim 1 wherein said signals defining positions of known locations define positions of at least four unknown locations, and wherein said second computer means comprises:

third computer means responsive to said signals defining positions and said signals defining distance differences for producing signals mathematically defining the axis of a second conic, said axis passing through said unknown location; and fourth computer means responsive to said signals defining said first and second conic axes for producing signals mathematically defining the intersection of said axes of said first and second conics, said intersection defining the position of said unknown location.

3. Apparatus as defined in claim 2 wherein said first computer means comprises a series of multiplier and adder circuits arranged to produce signals equivalent to the coefficients of an equation AX+BY=C defining the axis of said conic and wherein said third computer means comprises a series of multiplier and adder circuits arranged to produce signals equivalent to the coefficients of an equation DX+EY=F defining the axis of said second conic.

4. Apparatus as defined in claim 3 wherein said fourth computer means comprises a plurality of multiplication, subtraction and division circuits responsive to said signals equivalent to the coefficients of an equation AX+BY=C and sais signals equivalent to the coefficients of an equation DX+EY=F arranged to produce output signals equivalent to (CE-FB)/(AE-BD) and (AB-CD)/(AE-BD).

* * * * *